(12) United States Patent
Heyne et al.

(10) Patent No.: US 10,943,711 B2
(45) Date of Patent: Mar. 9, 2021

(54) MOTOR VEHICLE CHARGING CABLE

(71) Applicant: Dr. Ing. h.c. F. Porsche Aktiengesellschaft, Stuttgart (DE)

(72) Inventors: Raoul Heyne, Wiernsheim (DE); Jari Rönfanz, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/263,251

(22) Filed: Jan. 31, 2019

(65) Prior Publication Data
US 2019/0237218 A1    Aug. 1, 2019

(30) Foreign Application Priority Data
Feb. 1, 2018  (DE) .......................... 102018102207.7

(51) Int. Cl.
*H01B 7/42* (2006.01)
*B60L 53/302* (2019.01)
(Continued)

(52) U.S. Cl.
CPC .............. *H01B 7/423* (2013.01); *B60L 53/16* (2019.02); *B60L 53/18* (2019.02); *B60L 53/302* (2019.02);
(Continued)

(58) Field of Classification Search
CPC ...... B60L 2240/36; B60L 53/16; B60L 53/18; B60L 53/302; H01B 7/423; H01R 9/11
See application file for complete search history.

(56) References Cited

U.S. PATENT DOCUMENTS 3,483,313 A * 12/1969 Schaffhauser ........... H01B 7/12
174/101.5
2009/0178825 A1* 7/2009 Wu ........................ H01B 7/425
174/113 R
(Continued)

FOREIGN PATENT DOCUMENTS

CN     201229802 Y    4/2009
CN     106782835 A    5/2017
(Continued)

OTHER PUBLICATIONS

Notice of Reasons for Refusal for Japanese Application No. 2019-009267, dated Jan. 29, 2020, 2 pages.
(Continued)

*Primary Examiner* — William H. Mayo, III
*Assistant Examiner* — Rhadames Alonzo Miller
(74) *Attorney, Agent, or Firm* — RatnerPrestia

(57) ABSTRACT

Motor vehicle charging cable for DC voltage charging an electrical energy storage device of a motor vehicle includes a first electrical conductor for a first DC voltage phase, and a second electrical conductor for a second DC voltage phase. The first electrical conductor and the second electrical conductor each have an insulation layer and conductor cores which run in the respective insulation layer and form a conductor core strand. The first and the second electrical conductor each have a first coolant duct for cooling the respective conductor core strand from the inside, which first coolant duct is surrounded by the respective conductor cores. The first and the second electrical conductor each further have a second coolant duct for cooling the respective conductor core strand from the outside, which second coolant duct surrounds the respective conductor cores.

22 Claims, 2 Drawing Sheets

(51) Int. Cl.
    *B60L 53/16*     (2019.01)
    *B60L 53/18*     (2019.01)
    *H01B 9/00*     (2006.01)
    *H01R 4/20*     (2006.01)
    *H01R 9/11*     (2006.01)

(52) U.S. Cl.
    CPC .......... *H01B 9/006* (2013.01); *B60L 2240/36* (2013.01); *H01B 7/425* (2013.01); *H01R 4/20* (2013.01); *H01R 9/11* (2013.01)

(56) References Cited

U.S. PATENT DOCUMENTS

| | | | |
|---|---|---|---|
| 2015/0217654 A1* | 8/2015 | Woo | B60L 11/1818 |
| | | | 320/109 |
| 2016/0200206 A1* | 7/2016 | Woo | B60L 11/1818 |
| | | | 320/109 |
| 2017/0028862 A1* | 2/2017 | Nagel | B60L 11/1818 |
| 2017/0144558 A1* | 5/2017 | Remisch | B60L 11/1818 |
| 2017/0338006 A1* | 11/2017 | Gontarz | B60L 53/14 |
| 2018/0158572 A1* | 6/2018 | Ernst | H01B 7/425 |
| 2018/0186315 A1* | 7/2018 | Terzis | H02G 15/007 |
| 2018/0264957 A1* | 9/2018 | Fuehrer | H01B 7/282 |
| 2018/0304757 A1* | 10/2018 | Vaughan | B60L 53/14 |
| 2019/0020140 A1* | 1/2019 | Fuehrer | H01R 13/04 |
| 2019/0036254 A1* | 1/2019 | Moseke | H01R 13/005 |
| 2019/0074620 A1* | 3/2019 | Moseke | H01R 13/005 |
| 2019/0109409 A1* | 4/2019 | Fuehrer | H01R 13/533 |
| 2019/0131035 A1* | 5/2019 | Fuhrer | H01B 7/42 |
| 2019/0164665 A1* | 5/2019 | Sato | H01B 9/006 |
| 2019/0214161 A1* | 7/2019 | Chen | B60L 50/50 |
| 2019/0217707 A1* | 7/2019 | Reber | B60L 1/02 |
| 2019/0217728 A1* | 7/2019 | Reber | B60L 53/11 |
| 2019/0221330 A1* | 7/2019 | Fuehrer | B60L 53/18 |
| 2019/0252095 A1* | 8/2019 | Mayer | B60L 53/16 |
| 2019/0291588 A1* | 9/2019 | Chou | B60L 53/16 |

FOREIGN PATENT DOCUMENTS

| | | | |
|---|---|---|---|
| CN | 206697276 U | 12/2017 | |
| DE | 102015120048 A1 | 5/2017 | |
| DE | 102016112306 A1 * | 1/2018 | .......... H01R 13/005 |
| DE | 102016112306 A1 | 1/2018 | |
| EP | 0823766 A1 | 2/1998 | |
| JP | 5415778 U | 2/1979 | |
| JP | 10106362 A | 4/1998 | |
| JP | 2018018748 A | 2/2018 | |
| WO | 2017133893 A1 | 8/2017 | |
| WO | 2018094927 A1 | 5/2018 | |

OTHER PUBLICATIONS

Decision of Refusal for Japanese Application No. 2019-009267, dated Sep. 30, 2020, 3 pages.

* cited by examiner

MOTOR VEHICLE CHARGING CABLE

CROSS-REFERENCE TO RELATED APPLICATION

This application claims priority to German Patent Application No. DE 10 2018 102 207.7, filed Feb. 1, 2018, which is incorporated by reference herein in its entirety.

FIELD OF THE INVENTION

The invention relates to a motor vehicle charging cable.

BACKGROUND OF THE INVENTION

DE 10 2015 120 048 A1, which is incorporated by reference herein, discloses a motor vehicle charging cable for DC voltage charging an electrical energy storage device of a motor vehicle. Therefore, this prior art discloses a motor vehicle charging cable comprising a first electrical conductor for a first DC voltage phase and a second electrical conductor for a second DC voltage phase, wherein the two electrical conductors are surrounded by a cable sheath. Each of the two electrical conductors has in each case an insulation layer, wherein conductor cores of the respective electrical conductor run in the insulation layer of the respective electrical conductor. A coolant duct in which a cooling fluid can be guided for the purpose of cooling the respective electrical conductor is formed between the respective insulation layer and the respective conductor cores of the respective electrical conductor. In this case, coolant flows around the respective conductor cores of the respective electrical conductor and accordingly cools said conductor cores from the outside.

SUMMARY OF THE INVENTION

Described herein is a motor vehicle charging cable having improved cooling.

The motor vehicle charging cable for DC voltage charging an electrical energy storage device of a motor vehicle includes a first electrical conductor for a first DC voltage phase, and a second electrical conductor for a second DC voltage phase. The first electrical conductor and the second electrical conductor each have an insulation layer and conductor cores which run in the respective insulation layer and form a conductor core strand. The first and the second electrical conductor each have a first coolant duct for cooling the respective conductor core strand from the inside, which first coolant duct is surrounded by the respective conductor cores. The first and the second electrical conductor each further have a second coolant duct for cooling the respective conductor core strand from the outside, which second coolant duct surrounds the respective conductor cores.

According to aspects of the invention, the first and the second electrical conductor of the motor vehicle charging cable each have a first coolant duct for cooling the respective conductor core strand from the inside, which first coolant duct is surrounded by the respective conductor cores.

According to aspects of the invention, the first and the second electrical conductor each further have a second coolant duct for cooling the respective conductor core strand from the outside, which second coolant duct surrounds the respective conductor cores.

In the case of the motor vehicle charging cable according to aspects of the invention, each electrical conductor or conductor core strand comprising conductor cores is cooled in each case from the inside and in each case from the outside. The respective first coolant duct serves for cooling the respective electrical conductor or conductor core strand comprising conductor cores from the inside. The respective second coolant duct serves for cooling the respective electrical conductor or conductor core strand comprising conductor cores from the outside. As a result, improved, more effective cooling of the electrical conductors of the motor vehicle charging cable is possible.

According to an advantageous development, coolant can flow through the first coolant duct of the respective electrical conductor in a first direction and through the second coolant duct of the respective electrical conductor in an opposite second direction, wherein the first and the second coolant duct of the respective electrical conductor define a conductor-specific cooling circuit of the respective electrical conductor. The respective first coolant duct and the respective second coolant duct form a conductor specific cooling circuit for the respective electrical conductor. The conductor core strand comprising conductor cores of the respective electrical conductor is cooled both from the inside and from the outside by means of the respective conductor-specific cooling circuit, specifically from the inside by means of the respective first coolant duct and from the outside by means of the respective second coolant duct. As a result, particularly effective cooling of the electrical conductors of a motor vehicle charging cable is possible.

Preferably, the first coolant duct of the respective electrical conductor defines a coolant feed line and the second coolant duct defines a coolant return line of the respective conductor-specific cooling circuit. When the respective first coolant duct of the respective electrical conductor defines the coolant feed line and the respective second coolant duct of the respective electrical conductor defines the coolant return line of the respective conductor-specific cooling circuit, heat can be dissipated particularly effectively by means of the motor vehicle charging cable.

According to an advantageous development, pipe-like spacers, which subdivide the respective second coolant duct, are positioned between the conductor cores of the respective electrical conductor and the insulation layer of the respective electrical conductor. The spacers serve for particularly effective flow through the respective second coolant duct of the respective electrical conductor.

According to an advantageous development, in the region of a motor vehicle-side end of the motor vehicle charging cable and/or in the region of a charging column-side end of the motor vehicle charging cable, the conductor cores of the respective electrical conductor are each crimped by means of a crimping sleeve onto a crimping contact which defines the respective first coolant duct in sections. As a result, effective electrical contact-connection of the conductor cores of the respective electrical conductor is possible in the region of the two ends of the motor vehicle charging cable, wherein the crimping contact defines the respective first coolant duct in sections and therefore guides the coolant in the region of the two ends of the motor vehicle charging cable.

In the region of the motor vehicle-side end of the motor vehicle charging cable, the crimping contact of the respective electrical conductor, adjacent to a plug-in contact of the respective electrical conductor, preferably has recesses for transferring the coolant from the respective first coolant duct to the respective second coolant duct. As a result, it is possible, in the region of the motor vehicle-side end of the motor vehicle charging cable, to effectively transfer the coolant from the first coolant duct to the second coolant duct and in the process also to cool the plug-in contact of the respective electrical conductor from the rear.

In the region of the charging column-side end of the motor vehicle charging cable, coolant can preferably be supplied starting from a charging column, by means of the crimping contact, to the first coolant duct of the respective electrical conductor and can preferably be discharged to the charging column from the second coolant duct of the respective electrical conductor. These details serve for effectively guiding the coolant in the region of the charging column-side end of the motor vehicle charging cable, specifically firstly for supplying the coolant to the respective first coolant duct and secondly for discharging the coolant from the respective second coolant duct of the respective electrical conductor.

BRIEF DESCRIPTION OF THE DRAWINGS

Preferred developments of the invention can be gathered from the dependent claims and the following description. Exemplary embodiments of the invention will be explained in more detail with reference to the drawing, without the invention being restricted to said exemplary embodiments. In the drawing:

DETAILED DESCRIPTION OF THE INVENTION

The invention relates to a motor vehicle charging cable for DC voltage charging an electrical energy storage device of a motor vehicle.

Figure 1:
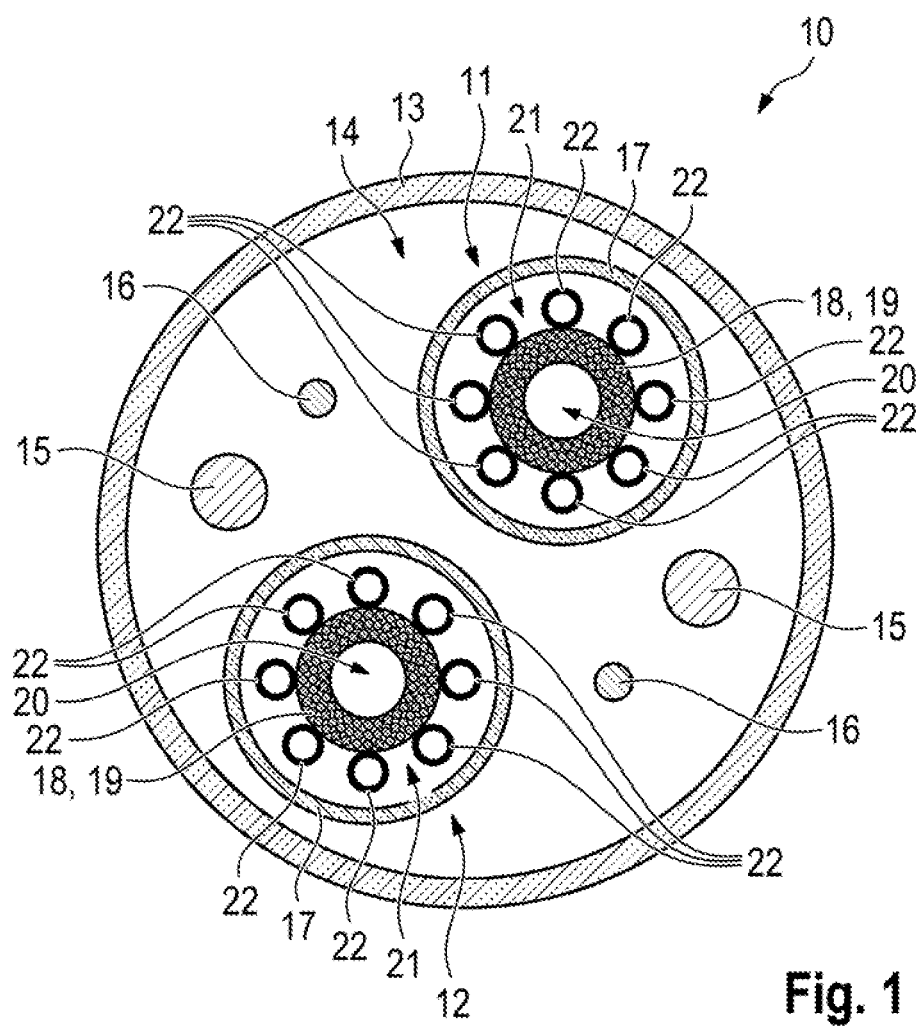
FIG. 1 shows a highly schematic cross section through a motor vehicle charging cable.

FIG. 1 shows a highly schematic cross section through a motor vehicle charging cable 10. The motor vehicle charging cable 10 has a first electrical conductor 11 for a first DC voltage phase and also has a second electrical conductor 12 for a second DC voltage phase. The two electrical conductors 11, 12 are surrounded by a cable sheath 13. In the exemplary embodiment shown in FIG. 1, not only are the two electrical conductors 11, 12 for the two DC voltage phases positioned within a hollow space 14 which is defined by the cable sheath 13, but rather strain-relief elements 15 and also at least one data conductor 16 optionally also run within this hollow space 14 in the exemplary embodiment illustrated in FIG. 1. Optionally, filler material can further be at least partially arranged in the hollow space 14.

Each of the two electrical conductors 11, 12 has an insulation layer 17. Furthermore, each of the two electrical conductors 11, 12 has a plurality of conductor cores 18 which run in the respective insulation layer. In the region of each electrical conductor 11, 12, the respective conductor cores 18 are preferably twisted to form a conductor core strand 19 or a conductor core bundle in each case.

Furthermore, each electrical conductor 11, 12 has in each case one first coolant duct 20 which is surrounded by the respective conductor cores 18 of the conductor core strand 19 of the respective electrical conductor 11, 12 and which serves for cooling the respective conductor cores 18 or the conductor core strand 19 of the respective electrical conductor 11, 12 from the inside.

In addition to this first, inner coolant duct 20, each electrical conductor 11, 12 has a second coolant duct 21 which surrounds the respective conductor cores 18 of the conductor core strand 19 of the respective electrical conductor 11, 12 and which serves for cooling the conductor cores 18 or the conductor core strand 19 of the respective electrical conductor 11, 12 from the outside.

In the case of the motor vehicle charging cable 10 according to aspects of the invention, the conductor core strand 19 of each electrical conductor 11, 12 is cooled both from the inside and from the outside for the DC voltage phases, specifically from the inside by means of the respective first coolant duct 20 around which the respective conductor cores 18 of the respective conductor core strand 19 extend, and also from the outside by means of the respective second coolant duct 21 which extends around the respective conductor cores 18 of the respective conductor core strand 19.

In this case, coolant can flow through the respective first coolant duct 20 in a first direction and through the respective second coolant duct 21 in an opposite second direction. The first coolant duct 20 and the second coolant duct 21 of the respective electrical conductor 11, 12 accordingly define a conductor-specific cooling circuit of the respective electrical conductor 11, 12.

One of the coolant ducts 20, 21 defines a coolant feed line and the other of the coolant ducts 20, 21 defines a coolant return line.

In the preferred exemplary embodiment, the first, inner coolant duct 20 of the respective electrical conductor 11, 12 defines a coolant feed line, and the second, outer coolant duct 21 of the respective electrical conductor 11, 12 defines a coolant return line of the respective conductor-specific cooling circuit.

Pipe-like spacers 22 are preferably positioned between the conductor cores 18 of the respective conductor core strand 19 of the respective electrical conductor 11, 12 and the insulation layer 17 of the respective electrical conductor 11, 12. In this case, these pipe-like spacers 22 subdivide the respective second coolant duct 21, wherein cooling medium not only flows around but furthermore also flows through the pipe-like spacers 22 in a preferred embodiment.

Figure 2:
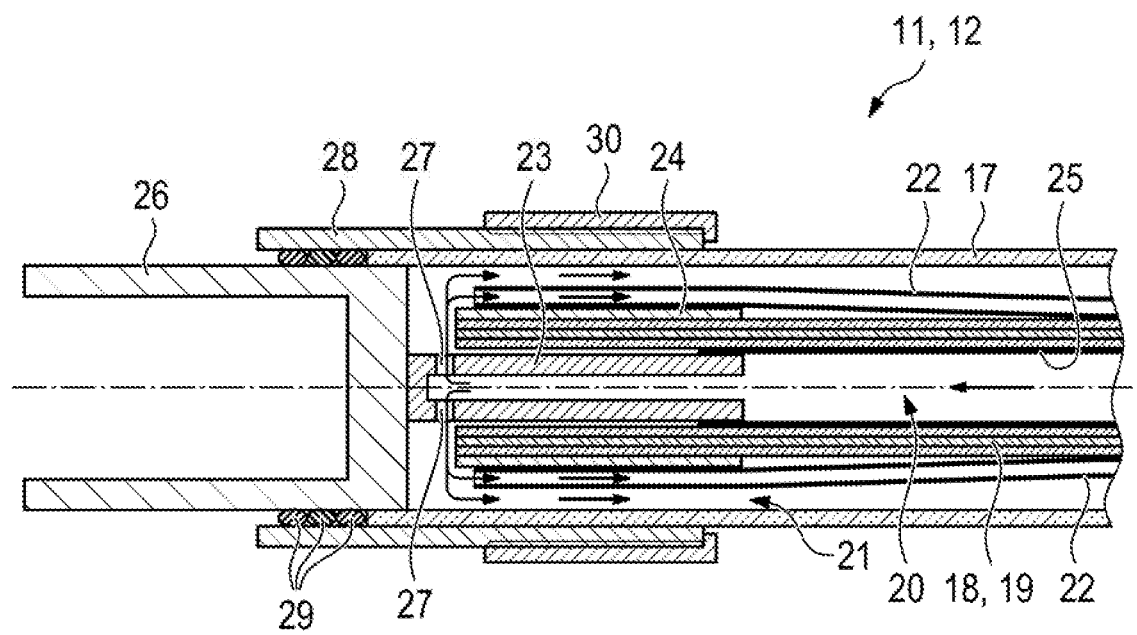
FIG. 2 shows a cross section, rotated through 90° in relation to FIG. 1, through a conductor of the motor vehicle charging cable in the region of a motor vehicle-side end of the motor vehicle charging cable.

FIG. 2 shows a cross section through one of the electrical conductors 11, 12 in the region of a motor vehicle-side end of the motor vehicle charging cable 10 and therefore of the respective electrical conductor 11, 12. FIG. 2 shows that, in the region of the motor vehicle-side end of the motor vehicle charging cable, the conductor cores 18 of the respective electrical conductor 11, 12 are crimped onto a crimping contact 23 by means of a crimping sleeve 24, wherein the crimping contact 23 defines the respective first coolant duct 20 in sections, specifically in the region of the motor vehicle-side end of the motor vehicle charging cable 10 or of the respective electrical conductor 11, 12 of said motor vehicle charging cable.

In this way, good electrical contact is formed between the conductor cores 18 and the electrically conductive crimping contact 23. In the region of the motor vehicle-side end of the motor vehicle charging cable, the crimping contact 23 is accordingly arranged radially within the conductor core strand 19 comprising conductor cores 18 and the crimping sleeve 24 is arranged radially outside the conductor core strand 19.

It can be seen in FIG. 2 that, in the exemplary embodiment shown, a hose 25 is connected to the crimping contact 23 and, like the crimping contact 23, extends within the conductor core strand 19 comprising conductor cores 18 and, together with the crimping contact 23, defines the first, inner coolant duct 20. This hose 25 can also be dispensed with.

The crimping contact 23 to which the conductor cores 18 of the respective electrical conductor 11, 12 are contact-connected is electrically conductively connected to a plug-in contact 26 in the region of the respective electrical conductor 11, 12. A step-like portion of widened diameter is formed between the crimping contact 23 and the plug-in contact 26.

According to FIG. 2, in the region of the motor vehicle-side end of the motor vehicle charging cable 10 or in the region of the motor vehicle-side end of the respective electrical conductor 11, 12 of the motor vehicle charging cable 10, the respective crimping contact 23 of the respective electrical conductor 11, 12, adjacent to the plug-in contact 26, has recesses 27 for transferring the coolant from the respective first coolant duct 20 to the respective second coolant duct 21.

These recesses 27 are formed directly adjacent to the portion of enlarged diameter between the crimping contact 23 and the plug-in contact 26, so that the plug-in contact 26 can be cooled by means of the coolant, which flows through the recesses 27, from the rear. As a result, the respective plug-in contact 26 of the respective electrical conductor 11, 12 can also be effectively cooled by means of the coolant.

Subsequently, the coolant flows back in the direction of the opposite, charging column-side end of the motor vehicle charging cable 10 or the opposite, charging column-side end of the respective electrical conductor 11, 12 by means of the second, outer coolant duct 21.

It can further be seen in FIG. 2 that, in the region of the motor vehicle-side end of the motor vehicle charging cable 10, the insulation 17 of the respective electrical conductor 11, 12 is held on the plug-in contact 26 by means of a connecting sleeve 28, wherein a sealing element 29 is positioned between the connecting sleeve 28 and the plug-in contact 26. A corresponding force is applied to the connecting sleeve 28 by means of a compression screw 30 in order to reliably seal off the connecting region between the connecting sleeve 28, the plug contact 26 and the insulation 17.

Figure 3:
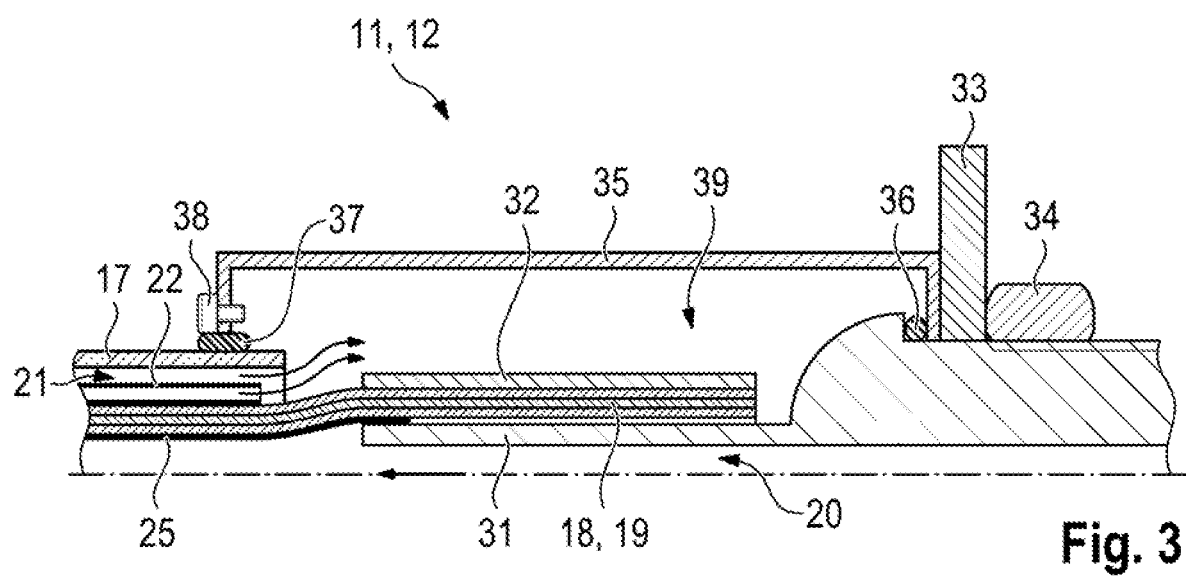
FIG. 3 shows a cross section, rotated through 90° in relation to FIG. 1, through a conductor of the motor vehicle charging cable in the region of a charging column-side end of the motor vehicle charging cable.

FIG. 3 shows a detail of a motor vehicle charging cable 10 in the region of a charging column-side end of said motor vehicle charging cable, specifically in the region of an electrical conductor 11 or 12 of the motor vehicle charging cable 10. The conductor cores 18 of the respective electrical conductor 11, 12 are crimped onto a crimping contact 31 with the aid of a crimping sleeve 32 in the region of the charging column-side end of the motor vehicle charging cable too.

The crimping contact 31 defines the first, inner coolant duct 20 in sections in the region of the charging column-side end too. The conductor cores 18 of the conductor core strand 19 are accordingly electrically contact-connected to the crimping contact 31, wherein a section of the crimping contact 31, which section protrudes in relation to the conductor cores 18, is electrically contact-connected, within a charging column not shown in detail, to a busbar 33 of the charging column, wherein this electrical connection between the busbar 33 of the charging column and the crimping contact 31 which is present at the charging column-side end is secured by means of a nut 34 which is screwed onto that section of the crimping contact 31 which protrudes in relation to the conductor cores 18.

Starting from the charging column, the coolant can be supplied to the respective electrical conductor 11, 12, specifically to the first, inner coolant duct 20 which is supplied with coolant by means of the crimping contact 31, wherein the crimping contact 31, in the region of the charging column, defines the first, inner coolant duct 20 of the respective electrical conductor 11, 12 of the motor vehicle charging cable 10 in sections.

In the region of the charging column-side end of the motor vehicle charging cable 10 shown in FIG. 3, not only can coolant be supplied to the first coolant duct 20 of the respective electrical conductor 11, 12 of the motor vehicle charging cable 10, but rather coolant can also be discharged from the second coolant duct 21 of the respective electrical conductor 11, 12 to the charging column in the region of this charging column-side end too, specifically, preferably according to FIG. 3, to a receiving space 39 which is defined by a housing 35 and into which the coolant flows starting from the second coolant duct 21 of the respective electrical conductor 11, 12.

In this case, this housing 35 is firstly sealed off from the crimping contact 31 by means of a seal 36 and secondly sealed off from the insulation 17 of the respective electrical conductor 11, 12 by means of a seal 37. The seal 36 is fixed or clamped by means of the nut 34 between the busbar 33 and the crimping contact 31 with the interposition of a section of the housing 35.

In the region of the seal 37, a compression screw 38 applies a force in order to seal off a corresponding section of the housing 35 from the insulation 17 of the respective electrical conductor 11, 12. The compression screw 38 is preferably embodied as a twin compression screw.

In the case of the motor vehicle charging cable 10 according to aspects of the invention for DC voltage charging an electrical energy storage device of a motor vehicle, the two electrical conductors 11, 12 are accordingly individually cooled for the two DC voltage phases, specifically both from the inside and also from the outside, specifically by means of the first coolant duct 20, which extends within the respective conductor core strand 19, from the inside, and also from the outside by means of the second coolant duct 21 which extends outside the respective conductor core strand 19.

At the motor vehicle-side end of the motor vehicle charging cable 10, plug-in contacts 26 of the respective electrical conductors 11, 12 can also be effectively cooled, specifically by means of coolant which, directly adjacent to the plug-in contact, flows across from the first, inner coolant duct 20 to the second, outer coolant duct 21 and in this way cools the plug-in contact 26 from the rear.

This flow guidance is provided by means of the respective crimping contact 23 in the region of the motor vehicle-side end of the respective electrical conductor 11, 12 of the motor vehicle charging cable 10, which crimping contact is of hollow design and has the recesses 27 for allowing the coolant to flow across from the first coolant duct 20 to the second coolant duct 21.

At the opposite charging column-side end of the motor vehicle charging cable 10, coolant can be introduced into the first, inner coolant duct 20 of the respective electrical conductor 11, 12 and also coolant can be discharged from the second coolant duct 21 of the respective electrical conductor 11, 12.

The motor vehicle charging cable 10 according to aspects of the invention can be used to perform DC voltage charging with high DC voltages and direct currents for rapidly charging an electrical energy storage device of an electric vehicle.

What is claimed is:

1. A motor vehicle charging cable for DC voltage charging an electrical energy storage device of a motor vehicle, the motor vehicle charging cable comprising:
   a first electrical conductor for a first DC voltage phase, and
   a second electrical conductor for a second DC voltage phase,
   wherein the first electrical conductor and the second electrical conductor each have an insulation layer and conductor cores which run in the respective insulation layer and form a conductor core strand,
   wherein the first and the second electrical conductor each have a first coolant duct for cooling the respective conductor core strand from the inside, which first coolant duct is surrounded by the respective conductor cores,
   wherein the first and the second electrical conductor each further have a second coolant duct for cooling the respective conductor core strand from the outside, which second coolant duct surrounds the respective conductor cores,
   wherein each electrical conductor extends between a motor vehicle-side end and a charging column-side end,
   wherein, at the motor vehicle-side end, the first and the second electrical conductors each terminate at a plug-in contact,
   wherein, at the motor vehicle-side end of each electrical conductor, the insulation extends to a length beyond the respective conductor cores for connection to the respective plug-in contact,
   wherein, at the charging column-side end of each electrical conductor, the respective conductor cores extend to a length beyond the insulation for connection to a charging column-side crimping contact which defines the respective first coolant duct in sections.

2. The motor vehicle charging cable as claimed in claim 1, wherein the motor vehicle charging cable is configured such that coolant can flow through the first coolant duct of the respective electrical conductor in a first direction and through the second coolant duct of the respective electrical conductor in an opposite second direction, wherein the first and the second coolant duct of the respective electrical conductor define a conductor-specific cooling circuit of the respective electrical conductor.

3. The motor vehicle charging cable as claimed in claim 2, wherein the first coolant duct defines a coolant feed line and the second coolant duct defines a coolant return line of the respective conductor-specific cooling circuit.

4. The motor vehicle charging cable as claimed in claim 2, wherein the first coolant duct defines a coolant return line and the second coolant duct defines a coolant feed line of the respective conductor-specific cooling circuit.

5. The motor vehicle charging cable as claimed in claim 1, further comprising pipe-like spacers, which subdivide the respective second coolant duct, and are positioned between the conductor cores of the conductor core strand of the respective electrical conductor and the insulation layer of the respective electrical conductor.

6. The motor vehicle charging cable as claimed in claim 5, wherein the pipe-like spacers are configured such that cooling medium flows around and through the pipe-like spacers.

7. The motor vehicle charging cable as claimed in claim 1, and wherein, in a region of the motor vehicle-side end of the motor vehicle charging cable, the conductor cores of the conductor core strand of the respective electrical conductor are each crimped by a crimping sleeve onto a vehicle-side crimping contact which defines the respective first coolant duct in sections.

8. The motor vehicle charging cable as claimed in claim 7, wherein, the vehicle-side crimping contact of the respective electrical conductor adjacent to the plug-in contact of the respective electrical conductor has recesses for transferring the coolant from the respective first coolant duct to the respective second coolant duct.

9. The motor vehicle charging cable as claimed in claim 7, wherein, in the region of the charging column-side end of the motor vehicle charging cable, the motor vehicle charging cable is configured such that coolant can be supplied starting from a charging column, by way of the charging column-side crimping contact, to the first coolant duct of the respective electrical conductor.

10. The motor vehicle charging cable as claimed in claim 7, wherein, in the region of the charging column-side end of the motor vehicle charging cable, the motor vehicle charging cable is configured such that coolant can be discharged to the charging column from the second coolant duct of the respective electrical conductor.

11. The motor vehicle charging cable as claimed in claim 7, wherein the vehicle-side crimping contact of the respective electrical conductor adjacent to the plug-in contact of the respective electrical conductor abuts the plug-in contact.

12. The motor vehicle charging cable as claimed in claim 7, wherein an outer diameter of the vehicle-side crimping contact is constant along a length dimension for crimping purposes.

13. The motor vehicle charging cable as claimed in claim 1, wherein for the first and the second electrical conductors, the respective conductor core strand is at least partially positioned within the respective second coolant duct.

14. The motor vehicle charging cable as claimed in claim 1, wherein the first and the second electrical conductors each further comprise pipe-like spacers positioned within the respective second coolant duct.

15. The motor vehicle charging cable as claimed in claim 1, wherein for the first and the second electrical conductors, the respective conductor core strand is exposed to fluid within the respective second coolant duct.

16. The motor vehicle charging cable as claimed in claim 1, wherein the first and the second electrical conductors each further have a connecting sleeve that connects the plug-in contact with the respective insulation layer,
   wherein, for each electrical conductor, an end of the insulation layer extends to surround at least a portion of the plug-in contact such that a fluid passageway is defined between the plug-in contact, the insulation layer and the first coolant duct, and
   wherein the end of the insulation layer is directly connected to the plug-in contact.

17. The motor vehicle charging cable as claimed in claim 16, further comprising a compression screw applied over the connecting sleeve.

18. The motor vehicle charging cable as claimed in claim 16, wherein, for each electrical conductor, the insulation layer is sandwiched between the connecting sleeve and the plug-in contact.

19. The motor vehicle charging cable as claimed in claim 16, wherein, for each electrical conductor, the connecting sleeve overlaps the plug-in contact.

20. The motor vehicle charging cable as claimed in claim 1, wherein the charging column-side crimping contact is directly connected to a bus bar of a charging column.

21. The motor vehicle charging cable as claimed in claim 1, further comprising a housing defining a receiving space in which the charging column-side crimping contact and the charging column-side end of at least one of the electrical conductors are positioned, and wherein the insulation of said at least one of the electrical conductors is connected to the housing.

22. The motor vehicle charging cable as claimed in claim 21, further comprising a crimping sleeve positioned over the charging column-side crimping contact for crimping conducting cores onto the charging column-side crimping contact.

\* \* \* \* \*